United States Patent
Wang et al.

(10) Patent No.: US 9,372,360 B2
(45) Date of Patent: Jun. 21, 2016

(54) TOUCH LIQUID CRYSTAL DISPLAY DEVICE

(71) Applicant: Shanghai Tianma Micro-Electronics Co., Ltd., Shanghai (CN)

(72) Inventors: Lihua Wang, Shanghai (CN); Qijun Yao, Shanghai (CN); Jun Ma, Shanghai (CN); Conghua Ma, Shanghai (CN); Lijun Zhao, Shanghai (CN); Quanpeng Yu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 246 days.

(21) Appl. No.: 14/150,530

(22) Filed: Jan. 8, 2014

(65) Prior Publication Data

US 2014/0118642 A1    May 1, 2014

Related U.S. Application Data

(63) Continuation of application No. PCT/CN2013/074005, filed on Apr. 10, 2013.

(30) Foreign Application Priority Data

Sep. 24, 2012 (CN) .......................... 2012 1 0359790

(51) Int. Cl.
*G02F 1/1333* (2006.01)
*G02F 1/1343* (2006.01)
(Continued)

(52) U.S. Cl.
CPC ...... *G02F 1/13338* (2013.01); *G02F 1/134336* (2013.01); *G06F 3/044* (2013.01);
(Continued)

(58) Field of Classification Search
CPC .......... G02F 1/13338; G02F 1/134336; G06F 3/0412; G06F 3/0418; G06F 3/044; G06F 2203/04103; G06F 2203/04111
See application file for complete search history.

(56) References Cited

U.S. PATENT DOCUMENTS 7,129,935 B2 * 10/2006 Mackey .................. G06F 3/044
                                                   178/18.06
7,864,503 B2 *  1/2011 Chang .................... G06F 3/044
                                                   200/269

(Continued)

FOREIGN PATENT DOCUMENTS

CN         101598862 A    12/2009
CN         101644981 A     2/2010
(Continued)

OTHER PUBLICATIONS

Office Action in corresponding Chinese Application No. 201210359790.3, dated Sep. 15, 2015.
(Continued)

*Primary Examiner* — Ryan Crockett
(74) *Attorney, Agent, or Firm* — Alston & Bird LLP

(57) ABSTRACT

A touch liquid crystal display device includes a first substrate and a second substrate opposite to each other, and a liquid crystal layer disposed between the first and second substrates. The first substrate includes a touch layer disposed on a surface of the first substrate facing the liquid crystal layer, an insulating layer disposed on a surface of the touch layer and covering the touch layer, and a pixel array structure disposed on a surface of the insulating layer facing away from the touch layer. The touch layer is disposed between the pixel array structure and the first substrate. Only a filming process and a photoetching process of the touch layer and a deposition process of the insulating layer are additionally required to transform a non-touch liquid crystal display device to a touch liquid crystal display device.

19 Claims, 8 Drawing Sheets

(51) Int. Cl.
*G06F 3/044* (2006.01)
*G06F 3/041* (2006.01)

(52) U.S. Cl.
CPC ........... *G06F 3/0412* (2013.01); *G06F 3/0418* (2013.01); *G06F 2203/04103* (2013.01); *G06F 2203/04111* (2013.01)

(56) References Cited

U.S. PATENT DOCUMENTS

| | | |
|---|---|---|
| 2010/0171894 A1 | 7/2010 | Lee et al. |
| 2010/0265210 A1* | 10/2010 | Nakanishi ................ G09G 5/18 345/174 |
| 2011/0102370 A1* | 5/2011 | Kono ....................... G06F 3/044 345/174 |
| 2011/0227850 A1* | 9/2011 | Oh ......................... G02F 1/13338 345/173 |
| 2011/0242444 A1* | 10/2011 | Song ..................... G06F 3/0412 349/43 |
| 2012/0050180 A1 | 3/2012 | King et al. |
| 2012/0273336 A1* | 11/2012 | Kuriki ..................... G06F 3/044 200/600 |
| 2013/0265276 A1* | 10/2013 | Obeidat ................. G06F 3/044 345/174 |
| 2013/0300952 A1* | 11/2013 | Yeh ...................... G02F 1/13338 349/12 |
| 2014/0078104 A1* | 3/2014 | Lee ........................ G06F 3/044 345/174 |

FOREIGN PATENT DOCUMENTS

| | | |
|---|---|---|
| CN | 101963713 A | 2/2011 |
| CN | 102236194 A | 11/2011 |
| CN | 102338945 A | 2/2012 |
| EP | 2431846 A1 | 9/2011 |

OTHER PUBLICATIONS

Supplementary European Search Report as issued in corresponding European Application No. 13830164.3, dated May 13, 2015.

* cited by examiner

TOUCH LIQUID CRYSTAL DISPLAY DEVICE

CROSS-REFERENCES TO RELATED APPLICATIONS

This application claims priority to and is a continuation of PCT/CN2013/074005, filed on Apr. 10, 2013, which claims the benefit of Chinese patent application No. 201210359790.3, entitled "TOUCH LIQUID CRYSTAL DISPLAY DEVICE", filed with the State Intellectual Property Office on Sep. 24, 2012, the contents of which are incorporated herein by reference in their entirety.

TECHNICAL FIELD

The present invention relates to touch display, and in particular to a touch liquid crystal display device.

BACKGROUND OF THE INVENTION

Touch panels, as input mediums, can provide simple, convenient and natural human-computer interactions at present. Therefore, touch panels are used more and more in many electronic products such as mobile phones, laptops, MP3/MP4 players and the like. In order to reduce the cost of an electronic device and make the electronic device lighter and thinner, a touch panel is generally integrated into the liquid crystal display panel.

In order to make the liquid crystal display with touch function lighter and thinner, an in cell touch display is developed in the prior art, in which the touch panel is integrated with the liquid crystal display panel. However, the process for manufacturing the in cell touch liquid crystal display apparatus in the prior art is complex.

BRIEF SUMMARY OF THE INVENTION

Certain embodiments of the present invention relate to a touch liquid crystal display device. In some embodiments, the touch liquid crystal display device includes a first substrate and a second substrate, the first substrate and the second substrate are opposite to each other, and a liquid crystal layer disposed between the first substrate and the second substrate. The first substrate comprises a touch layer disposed on a surface of the first substrate facing the liquid crystal layer, an insulating layer disposed on a surface of the touch layer and covering the touch layer, and a pixel array structure disposed on a surface of the insulating layer facing away from the touch layer.

BRIEF DESCRIPTION OF THE DRAWINGS

FIG. 7A illustrates a structural schematic diagram of the driving electrodes or the sensing electrodes in the prior art, and FIG. 7B illustrates a structural schematic diagram of the driving electrodes or the sensing electrodes according to another embodiment of the present invention;

DETAILED DESCRIPTION OF THE INVENTION

Figure 1:
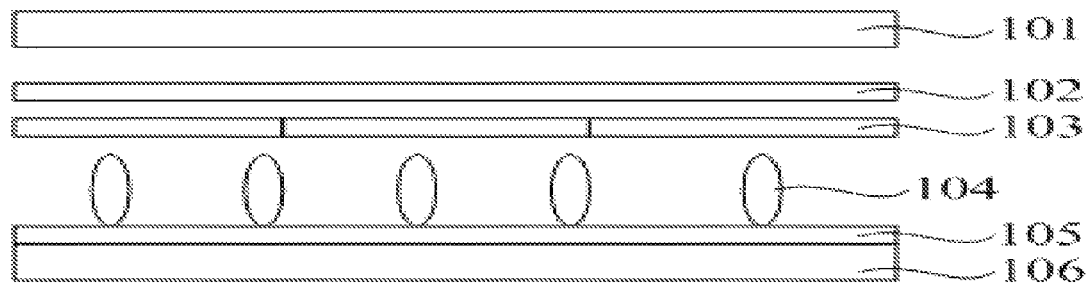
FIG. 1 is a simplified structural diagram of an in-cell touch display in the prior art.

FIG. 1 illustrates a simplified structural diagram of an in-cell touch display in the prior art. The in-cell liquid crystal display includes: an upper substrate 101, a touch panel 102 located under the upper substrate 101, a color filter layer 103 located under the touch panel 102, a liquid crystal layer 104 located under the color filter layer 103, a pixel array structure 105 located under the liquid crystal layer 104 and a lower substrate 106 located under the pixel array structure 105.

As shown in FIG. 1, in the in-cell touch display in the prior art, the touch panel 102 is disposed between the color filter layer 103 and the upper substrate 101. In the prior art, the color filter layer 103 and the liquid crystal display panel are usually manufactured by different manufacturers. A manufacturer of color filter layer 103 mainly performs certain pre-production processes, which may include providing a substrate; forming a color filter layer on a surface of the substrate; planarizing the color filter layer to form a color filter structure. A manufacturer of the liquid crystal display panel performs post production based on the pre-produced color filter structure obtained directly from the manufacture of the color filter, so as to obtain a liquid crystal display device.

Therefore, the pre-production process of the color filter structure needs to be changed to embed the touch panel 102 between the color filter layer 103 and the upper substrate 101 for manufacturing the in cell liquid crystal display, and the changed preliminary production process of the color filter structure may include: providing a substrate; forming a touch panel on a surface of the substrate; forming a color filter layer on a surface of the touch panel; and planarizing the color filter layer. A touch panel may be formed on a surface of the substrate by forming an electrode layer on the surface of the substrate, and etching the electrode layer to form the touch panel on the surface of the substrate.

However, in the prior art, manufactured devices used by manufacturers of the color filter structure are too coarse to accomplish fine process such as etching. Moreover, different in-cell liquid crystal displays have different requirements on the touch panels, and the manufacturers of the color filter structure are not able to provide a color filter structure suitable for all in cell liquid crystal displays, which are not conductive to batch production. Therefore, the manufacturers of the liquid crystal display panel have to change the pre-produced color filter structure obtained from the manufacturers of the color filter structure prior to integrating with the touch panel, and the process is complex.

In addition, not only a driving circuit for providing a driving signal to the pixel array structure but also a driving circuit for providing a driving signal to the electrode in the touch panel need to be configured in the structure of the in-cell touch display. Two implementations are as follows. Each of the pixel array structure and the electrode in the touch panel may be provided with a driving circuit. Alternatively, the pixel array structure is provided with a driving circuit, and a signal transmission circuit is provided for transmitting a driving signal from the driving circuit to the electrode in the touch panel. However, both the above implementations will increase the size of the in cell touch display device.

In addition, in the case where the in cell touch display includes multiple driving electrodes and multiple sensing electrodes, and the multiple driving electrodes and multiple sensing electrodes are interleaved with each other and insulated from each other, the driving electrodes includes multiple driving sub-electrodes insulated from each other, or the sensing electrodes includes multiple sensing sub-electrodes insulated from each other. Therefore, a bridge structure needs to be disposed in the touch layer of the in cell touch display for electrically connecting the adjacent driving sub-electrodes or the adjacent sensing sub-electrodes, so the complexity of the process for manufacturing the in cell touch display and the thickness of the in cell liquid crystal display are increased.

Figure 2:
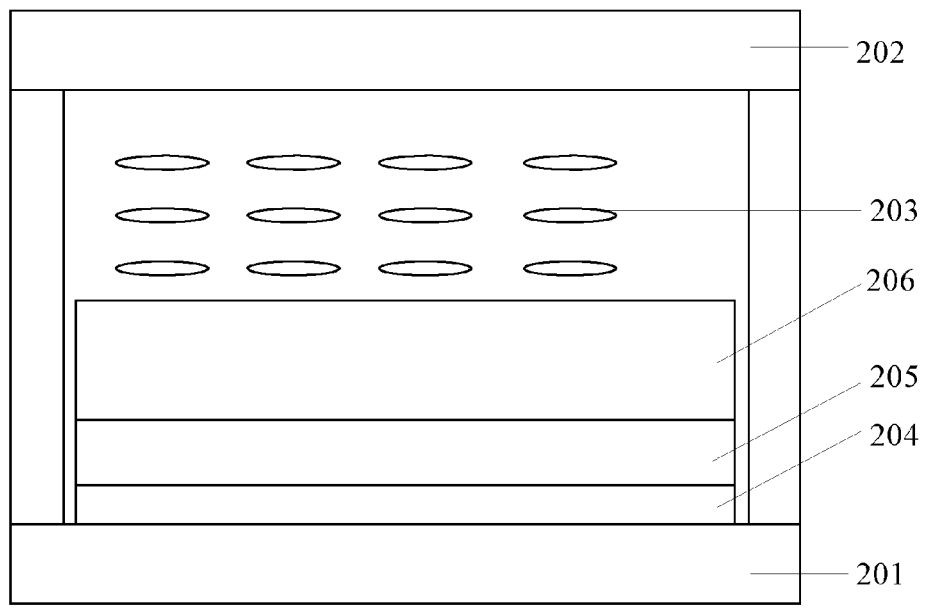
FIG. 2 is a simplified structural diagram of a touch liquid crystal display device according to an embodiment of the present invention.

In view of the above, embodiments of the present invention provide a touch liquid crystal display device. As illustrated in FIG. 2, the touch liquid crystal display device includes a first substrate 201 and a second substrate 202 which are opposite to each other, and a liquid crystal layer 203 disposed between the first substrate 201 and the second substrate 202. In addition, the touch liquid crystal display device further includes a touch layer 204 disposed on a surface of the first substrate 201 facing the liquid crystal layer 203, an insulating layer 205 disposed on a surface of the touch layer 204 and covering the touch layer 204, and a pixel array structure 206 disposed on a surface of the insulating layer 205 facing away from the touch layer 204.

According to an embodiment of the present invention, the touch layer 204 is disposed between the pixel array structure 206 and the first substrate 201. Only a photoetching process and a deposition process need to be additionally performed in the process for manufacturing a non-touch liquid crystal display device by the manufacturers of the liquid crystal display panel. That is, before the pixel array structure 206 is formed on the surface of the first substrate 201, a touch layer 204 is formed on the surface of the first substrate 201, then a touch electrode is formed on the touch layer 204 by using the photoetching process, and an insulating layer 205 is finally formed on the surface of the touch electrode to complete the touch liquid crystal display device according to an embodiment of the present invention. In this way, the process for manufacturing the touch liquid crystal display device according to an embodiment of the present invention is simple.

In order to make the objects, features and advantages of the present invention better understandable, specific embodiments of the present invention will be described in detail below in conjunction with the accompanying drawings.

Specific details will be set forth in the following descriptions of the present invention. However, the present invention may also be implemented in other ways different from the way described herein. Therefore, the present invention is not limited to the specific embodiments disclosed hereinafter.

An Embodiment

As illustrated in FIG. 2, a touch liquid crystal display device according to an embodiment of the present invention includes: a first substrate 201 and a second substrate 202, where the first substrate 201 and the second substrate 202 are opposite to each other, and a liquid crystal layer 203 disposed between the first substrate 201 and the second substrate 202. A touch layer 204 is disposed on a surface of the first substrate 201 facing the liquid crystal layer 203, an insulating layer 205 is disposed on a surface of the touch layer 204 and covers the touch layer 204, and a pixel array structure 206 is disposed on a surface of the insulating layer 205 facing away from the touch layer 204. The second substrate 202 includes a light-blocking layer (not shown in the figures) disposed on a side of the second substrate 202 facing the liquid crystal layer 203, and a color filter layer (not shown in the figures) disposed on a side of the light-blocking layer facing away from the second substrate 202.

The process for manufacturing the touch liquid crystal display device according to the embodiment of the present invention includes: providing a first substrate 201; forming a touch layer 204 on a surface of the first substrate 201; etching the touch layer 204 to form a touch electrode; forming an insulating layer 205 on a surface of the touch layer 204; and forming a pixel array structure 206 on a surface of the insulating layer 205; then sealing the above obtained structure. The pre-produced color filter structure (i.e., the second substrate 202) obtained from a manufacture of the color filter structure and the liquid crystal layer 203 are integrated together to obtain the touch liquid crystal display device.

Therefore, to obtain the touch liquid crystal display device according to the embodiment of the present invention, only the filming process and photoetching process of the touch panel and the deposition process of the insulating layer need to be additionally performed in the process for manufacturing a non-touch touch liquid crystal display device by the manufacturers of the liquid crystal display panel. In other words, before the pixel array structure 206 is formed on the surface of the first substrate 201, a conductive film is formed on the surface of the first substrate 201, then a touch layer 204 is formed by using the photoetching process, and an insulating layer 205 is finally formed on the surface of the touch electrode, therefore the touch liquid crystal display device according to an embodiment of the present invention is obtained. The process for manufacturing the touch liquid crystal display device is simple.

It should be noted that the touch layer and display panel are performed at the backside of the touch liquid crystal display device according to an embodiment of the present invention, that is, the touch layer and display panel are performed on a surface of the first substrate 201 facing away from the liquid crystal layer 203. Therefore, material of the insulating layer 205 disposed between the touch layer 204 and the pixel array structure 206 includes transparent materials. In one embodiment according to an embodiment of the present invention, the insulating layer 205 is a silicon nitride layer or an organic film.

In addition, since the touch layer and display panel are performed at the backside of the touch liquid crystal display device according to an embodiment of the present invention, there will be some light reflection if the driving electrodes and the sensing electrodes in the touch layer include common metal material. Therefore, in the embodiment of the present invention, the driving electrodes and the sensing electrodes are preferably transparent ITO electrodes or metal electrodes of non-reflective material such as chromium electrodes, thereby improving the display effect of the touch liquid crystal display device.

It should be noted that the driving electrodes and the sensing electrodes being transparent ITO electrodes or metal electrodes made of non-reflective material are only preferred embodiment. In other embodiments of the present invention, the driving electrodes and the sensing electrodes may include light-reflective material, and the light reflection effect of the touch liquid crystal display device is weakened and the display effect of the touch liquid crystal display device is improved as long as a suitable polarizer is selected. The present invention is not limited thereto.

In addition, in the touch liquid crystal display device according to the embodiment of the present invention, the touch layer 204 is disposed between the first substrate 201 and the pixel array structure 206, so that the pixel array structure 206 and the touch layer 204 may share a same driving circuit. Therefore, the size of the touch liquid crystal display device is reduced. Moreover, in the detection of the touch layer 204 in the touch liquid crystal display device, the detecting circuit of the touch layer 204 is easy to be integrated with the driving circuit of the touch liquid crystal display device.

In summary, the touch liquid crystal display device according to the embodiment of the present invention not only has a simple manufacturing process but also a reduced size.

Another Embodiment

Figure 3:
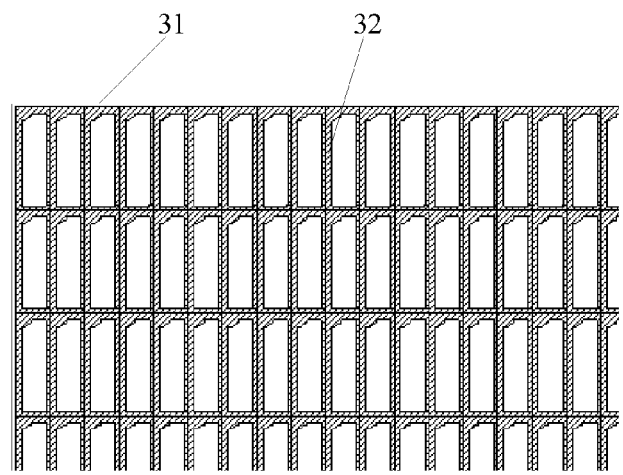
FIG. 3 is a simplified structural diagram of part of driving electrodes or part of sensing electrodes in a touch layer in the touch liquid crystal display device according to an embodiment of the present invention.
Figure 4A:
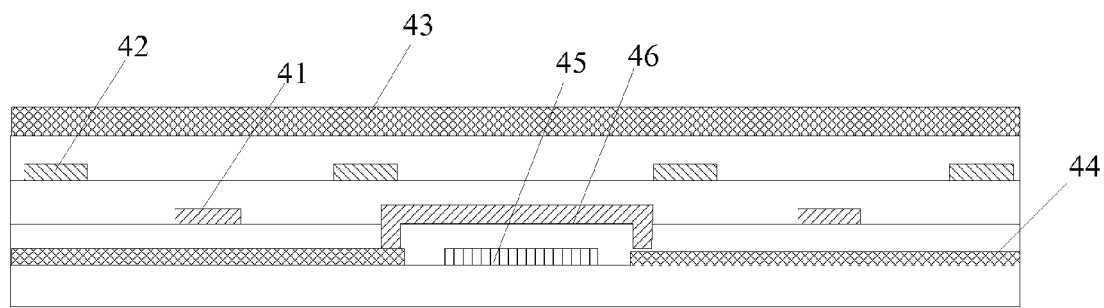
FIG. 4A is a simplified structural diagram of a first substrate in a touch liquid crystal display device according to an embodiment of the present invention.
Figure 4B:
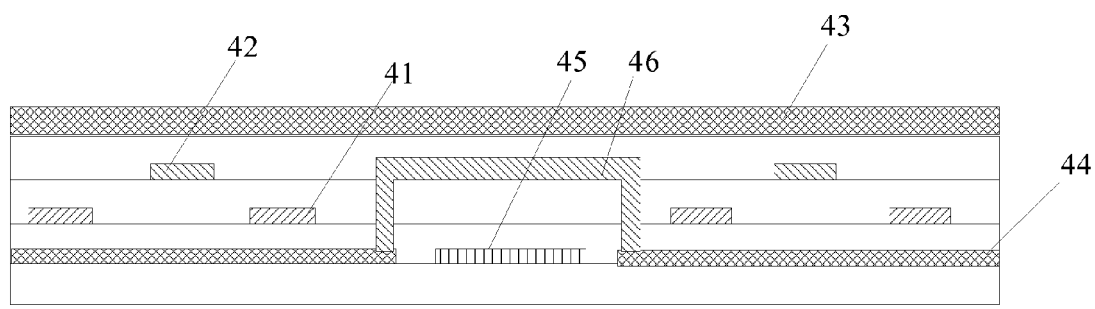
FIG. 4B is a simplified structural diagram of the first substrate in the touch liquid crystal display device according to another embodiment of the present invention.

Referring to FIGS. 2 to 4, FIG. 2 is a cross-section structural schematic diagram of a touch liquid crystal display device according to the present embodiment, FIG. 3 illustrates a structure of a driving electrodes or a sensing electrodes in a touch layer 204 of FIG. 2, FIG. 4A illustrates a structure of the touch layer 204, and FIG. 4B illustrates another structure of the touch layer 204.

In the touch liquid crystal display device according to an embodiment of the present invention, the touch layer 204 is a bi-layered structure. The touch layer 204 includes multiple driving electrodes and multiple sensing electrodes, and the driving electrodes are disposed in a same layer as the sensing electrodes. However, the adjacent driving electrodes or the adjacent sensing electrodes are electrically connected by a bridge structure, and the bridge structure is disposed in a different layer from the driving electrodes and the sensing electrodes.

As illustrated in FIG. 3, each of the driving electrodes and the sensing electrodes includes multiple horizontal metal wires 31 and multiple vertical metal wires 32 interleaved with each other. Moreover, the horizontal metal wires 31 and the vertical metal wires 32 of the driving electrodes and the sensing electrodes overlap with a light-blocking layer in the color filter structure (i.e., the second substrate 202 in FIG. 2). That is, the horizontal metal wires 31 and the vertical metal wires 32 do not occupy an aperture opening ratio independently. Regions surrounded by the horizontal metal wires 31 and the vertical metal wires 32 overlap with display regions of pixel units of the pixel array structure 206, therefore the aperture opening ratio of the touch liquid crystal display device is increased.

In the embodiment, the driving mode of the touch liquid crystal display device is Fringe Field Switching (FFS) mode.

However, the present invention is not limited to the specific embodiment, and the driving mode of the touch liquid crystal display device may also be other modes. As illustrated in FIGS. 4A and 4B, the pixel array structure 206 includes a gate electrode metal layer 41, a source/drain electrode metal layer 42 and a common electrode layer 43 in a sequence from bottom to top. The gate electrode metal layer 41 includes multiple horizontal driving lines, the source/drain electrode metal layer 42 includes multiple vertical driving lines, and the common electrode layer 43 is a layer structure in an entire surface. In the present embodiment, the driving electrodes and the sensing electrodes are interleaved with each other, and the driving electrodes and the sensing electrodes are insulated from each other.

As illustrated in FIGS. 4A and 4B, the touch layer 204 according to the present embodiment is a bi-layer structure. The driving electrode includes multiple driving sub-electrodes insulated from each other, the sensing electrode includes multiple sensing sub-electrodes insulated from each other, and the multiple driving sub-electrodes and the multiple sensing sub-electrodes are formed in a same metal layer. Specifically, as illustrated in FIG. 4A, a touch electrode 44 is a driving electrode, a touch electrode 45 is a sensing electrode, the adjacent driving sub-electrodes are electrically connected via a bridge structure 46 disposed in a different layer from the driving sub-electrodes, and the adjacent sensing sub-electrodes are electrically connected via a metal wire disposed in a same layer as the sensing sub-electrodes. As illustrated in FIG. 4B, a touch electrode 44 is a sensing electrode, a touch electrode 45 is a driving electrode, the adjacent sensing sub-electrodes are electrically connected via a bridge structure, where the bridge structure is disposed in a different layer from the sensing sub-electrodes, and the adjacent driving sub-electrodes are electrically connected via a metal lead, where the metal lead is disposed in a same layer as the driving sub-electrodes.

In the embodiment, the bridge structure 46 may be an interconnect metal in the same layer as the gate electrode metal layer 41 in the pixel array structure 206, as illustrated in FIG. 4A; or the bridge structure 46 may be an interconnect metal in the same layer as the source/drain electrode metal layer 42 in the pixel array structure 206, as illustrated in FIG. 4B. In the specific production processes, just one step of photoetching is needed to form both the gate electrode metal layer 41 and the bridge structure 46 or form both the source/drain electrode metal layer 42 and the bridge structure 46. Therefore, the process for manufacturing the touch liquid crystal display device is further simplified, and the thickness of the touch liquid crystal display device is reduced.

Similarly, in the case where the touch electrode 44 is the sensing electrode and the touch electrode 45 is the driving electrode, the sensing electrode 44 includes multiple sensing sub-electrodes insulated from each other, and the adjacent sensing sub-electrodes are electrically connected via a bridge structure 46 disposed in a different metal layer from the sensing sub-electrodes. The bridge structure 46 may be metal in the same layer as the gate electrode metal layer 41 in the pixel array structure 206, as illustrated in FIG. 4A; or may be metal in the same layer as the source/drain electrode metal layer 42 in the pixel array structure 206, as illustrated in FIG. 4B. In the specific production processes, just one step of photoetching is needed to form both the gate electrode metal layer 41 and the bridge structure 46 or form both the source/drain electrode metal layer 42 and the bridge structure 46. Therefore, the process for manufacturing the touch liquid crystal display device is further simplified, and the thickness of the touch liquid crystal display device is reduced.

In summary, in the touch liquid crystal display device according to the present embodiment of the present invention, the bridge structure 46 is metal in the same layer as the gate electrode metal layer 41 in the pixel array structure 206, or is metal in the same layer as the source/drain electrode metal layer 42 in the pixel array structure 206. Therefore, in the specific production processes, just one step of photoetching is needed to form both the gate electrode metal layer 41 and the bridge structure 46 or form both the source/drain electrode metal layer 42 and the bridge structure 46. Therefore, the process for manufacturing the touch liquid crystal display device is further simplified, and the thickness of the touch liquid crystal display device is reduced.

Another Embodiment

In conjunction with FIGS. 1 to 3 as described above, in the touch liquid crystal display device according to an embodiment of the present invention, the insulating layer 205 is disposed between the touch electrode in the touch layer 204 and the gate electrode metal layer 41. Therefore, a parasitic capacitance may be generated between the touch electrode in the touch layer 204 and the gate electrode metal layer 41. Similarly, the insulating layer 205 is disposed between the touch electrode in the touch layer 204 and the source/drain electrode metal layer 42 and between the touch electrode in the touch layer 204 and the common electrode layer 43, therefore parasitic capacitances may be generated between the touch electrode in the touch layer 204 and the source/drain electrode metal layer 42, and between the touch electrode in the touch layer 204 and the common electrode layer 43.

Figure 5:
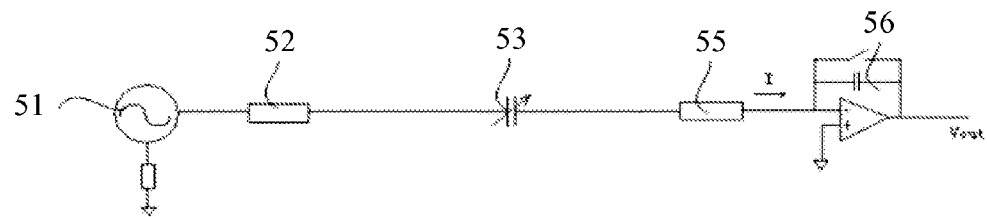
FIG. 5 is a schematic diagram of an ideal equivalent circuit of the touch liquid crystal display device according to an embodiment of the present invention.

FIG. 5 illustrates a schematic diagram of an ideal equivalent circuit of the touch liquid crystal display device of FIG. 2. The equivalent circuit includes: a signal source 51, a driving electrodes resistance 52, a mutual capacitance 53 between a driving electrode and a sensing electrode, a sensing electrode resistance 55, and a detecting circuit 56. The signal source 51 provides a driving signal to driving electrodes, and the detecting circuit 56 is used for signal detection. In the case where a finger touches a touch panel, part of current flows into the finger, the mutual capacitance 53 between the driving electrodes and the sensing electrodes is changed, and the touch position of the finger is determined according to the small current change caused by the change in the mutual capacitance 53 detected by the detecting circuit 56.

Figure 6:
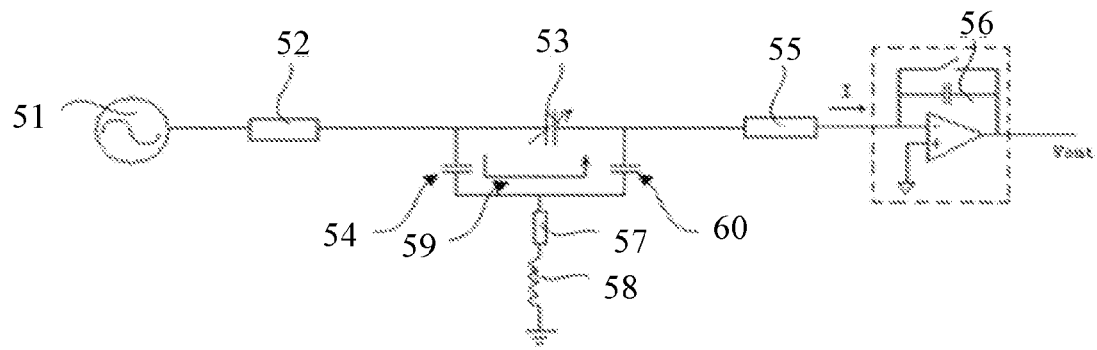
FIG. 6 is a schematic diagram of an actual equivalent circuit of the touch liquid crystal display device according to an embodiment of the present invention.

The parasitic capacitance between the common electrode layer 43 and the touch electrode in the touch layer according to the embodiment of FIG. 4 is taken as an example. The common electrode layer 43 has a layer structure in an entire surface, and in the case where the liquid crystal display device is used for displaying, a large driving parasitic capacitance 54 is generated between the common electrode layer 43 and the driving electrodes, and a large sensing parasitic capacitance 60 is generated between the common electrode layer 43 and the sensing electrodes at the same time, as illustrated in FIG. 6.

When the signal source 51 provides an alternating current (AC) signal, the AC signal enters into the detecting circuit 56 via the driving electrodes resistance 52, the mutual capacitance 53 and the sensing electrodes resistance 55. The large driving parasitic capacitance 54 and the large sensing parasitic capacitance 60 have small condensance compared with the AC signal transmitted from the signal source 51, and a resistance 57 of the common electrode layer 43 and an inductance 58 of the common electrode layer 43 prevent the AC signal from flowing into the ground terminal. Therefore, the AC signal sequentially passes through the driving parasitic capacitance 54 and the sensing parasitic capacitance 60, where the driving parasitic capacitance 54 and the sensing parasitic capacitance 60 have small condensance, thus a current path 59 is formed. After the AC signal passes through the current path 59, a large base signal is formed in the detecting circuit 56. The signal corresponding to the change in the mutual capacitance 53 is generally small and thus is easy to be neglected with respect to the large base signal, therefore the detecting circuit 56 may be unable to detect the signal corresponding to the change in the mutual capacitance 53, leading to a failed detection. Thus, the liquid crystal display device has low touch sensitivity.

Similarly, the parasitic capacitance generated between the gate electrode metal layer 41 and the touch electrode in the touch layer 204 and the parasitic capacitance generated between the source/drain electrode metal layer 42 and the touch electrode in the touch layer 204 may also affect the mutual capacitance 53 generated between the driving electrodes and the sensing electrodes, weaken the valid signal in the detecting circuit 56, and reduce the touch sensitivity of the touch liquid crystal display device.

In order to solve the above-mentioned problem, the touch liquid crystal display device is provided according to the present embodiment, where the common electrode layer 43 in the pixel array structure 206 includes multiple common electrodes whose arrangement pattern is the same as that of the electrodes in the touch layer.

It should be noted that the arrangement pattern of the common electrodes in the common electrode layer 43 being the same as the arrangement pattern of the electrodes in the touch layer refers to that: the common electrode layer 43 includes multiple block common electrodes, the shape of the profile of each of the block common electrodes is the same as the shape of the profile of the electrode in the touch layer disposed above the block common electrode, and the multiple block common electrodes in the common electrode layer 43 overlap with the electrodes in the touch layer disposed above the multiple block common electrodes in a light-transmission direction.

It should be noted that the block electrode of the common electrode is an entire block, which is unlike the electrode in the touch layer shown in FIG. 3 including horizontal metal wires 31 and vertical metal wires 32.

It should be understood that the horizontal metal wires 31 and the vertical metal wires 32 of the driving electrodes and the sensing electrodes of the touch panel are overlapped with the light-blocking layer in the color filter structure (i.e., the second substrate 202 in FIG. 2), and the regions surrounded by the horizontal metal wires 31 and the vertical metal wires 32 are overlapped with the display regions of pixel units of the pixel array structure 206, as described above. The common electrode includes multiple entire block electrodes. Thus the common electrode is disposed in each of the pixel units for driving the pixel units to display. The multiple block common electrodes are disconnected with each other, and the disconnected portion corresponds to the light-blocking layer of the color filter structure. A common signal may be input to the multiple block common electrodes by setting signal lines to drive the pixel units.

Since the driving electrodes and the sensing electrodes in the touch layer are separated from each other and the pattern of the multiple block common electrodes in the common electrode layer 43 is the same as the pattern of the electrodes in the touch layer, the pattern of the multiple block common electrodes in the common electrode layer 43 corresponding to the driving electrodes and the pattern of the multiple block common electrodes in the common electrode layer 43 corresponding to the sensing electrodes are also separated or disconnected. That is, the current path between the driving parasitic capacitance 54 and the sensing parasitic capacitance 60 is disconnected, thus the AC signal, which is sent from the signal source 51 and reaches the detecting circuit 56 via the driving parasitic capacitance 54 and the sensing parasitic capacitance 60, is greatly reduced. Therefore, no large base signal is formed at the detecting circuit 56, thereby weakening the influence of the parasitic capacitance generated between the common electrode layer and the touch electrode in the touch layer 204 on the mutual capacitance 53 between the driving electrodes and the sensing electrodes, enhancing the valid signal in the detecting circuit 56, and increasing the touch sensitivity of the touch liquid crystal display device.

Another Embodiment

As described in the above embodiments, the horizontal metal wires 31 and the vertical metal wires 32 in the driving electrodes and the sensing electrodes overlap with the light-blocking layer in the color filter structure (i.e., the second substrate 202 in FIG. 2), therefore the horizontal metal wires 31 and the vertical metal wires 32 do not occupy the aperture opening ratio independently. A large number of driving lines formed in the gate electrode or source/drain electrode metal layer are disposed at the portion of the pixel array structure 206 disposed on the surface of the first substrate 201 corresponding to the light-blocking layer in the color filter structure, therefore a large parasitic capacitance may be generated between the driving lines and the horizontal metal wires or the vertical metal wires of the driving electrodes and the sensing electrodes.

In order to further enhance the valid signal in the detecting circuit 56 and to increase the touch sensitivity of the touch liquid crystal display device, in the touch liquid crystal display device according to the embodiment, the number of the vertical metal wires 32 in the touch layer 204 is less than the number of the vertical metal driving lines in the pixel array structure 206, in addition, or alternatively, the number of the horizontal metal wires 31 in the touch layer 204 is less than the number of the horizontal metal driving lines in the pixel array structure 206.

FIG. 7A illustrates a structural schematic diagram of the driving electrodes or the sensing electrodes in the prior art, and FIG. 7B illustrates a structural schematic diagram of the driving electrodes or the sensing electrodes according to the embodiment of the present invention.

Therefore, the parasitic capacitance generated between the gate electrode metal layer 41 and the touch electrode in the touch layer 204 and the parasitic capacitance generated between the source/drain electrode metal layer 42 and the touch electrode in the touch layer 204 may also affect the mutual capacitance 53 between the driving electrodes and the sensing electrodes, therefore, the valid signal in the detecting circuit 56 is weakened and the touch sensitivity of the touch liquid crystal display device is reduced.

Specifically, the parasitic capacitance is generated between the gate electrode metal layer 41 and the touch electrode in the touch layer 204, this is because the gate electrode metal layer 41 includes multiple horizontal driving lines corresponding to the horizontal metal wires 31 in the driving electrodes and the sensing electrodes respectively and are disposed right above the horizontal metal wires 31, therefore, a parasitic capacitance is generated between each of the horizontal metal wires 31 and the corresponding horizontal driving line. The parasitic capacitance generated between the horizontal metal wire 31 in the driving electrodes and the corresponding horizontal driving line is the driving parasitic capacitance 54, and the parasitic capacitance generated between the horizontal metal wire 31 in the sensing electrodes and the corresponding horizontal driving line is the sensing parasitic capacitance 60. Therefore, a current path 59 is formed between the driving electrodes and the sensing electrodes, therefore, the base signal in the detecting circuit 56 is increased and the touch sensitivity of the touch liquid crystal display device is reduced.

However, in the present embodiment, the number of the horizontal metal wires 31 in the touch layer 204 is less than the number of the horizontal driving lines in the pixel array structure 206, and there has no one-to-one correspondence between the horizontal metal wires 31 and the horizontal driving lines. Therefore, the right opposite area between the horizontal metal wires 31 in the touch layer 204 and the horizontal driving lines is reduced as a whole, the parasitic capacitance generated between the horizontal metal wires 31 in the touch layer 204 and the horizontal driving lines is reduced, the influence of the parasitic capacitance generated between the horizontal metal wires 31 in the touch layer 204 and the horizontal driving lines on the mutual capacitance 53 between the driving electrodes and the sensing electrodes is weakened, the valid signal in the detecting circuit 56 is enhanced, and the touch sensitivity of the touch liquid crystal display device is increased.

It should be noted that in the present embodiment the number of the horizontal metal wires 31 in the touch layer 204 being less than the number of the horizontal driving lines in the pixel array structure 206 may be explained as follows:

the number of the horizontal metal wires 31 in the driving electrodes is less than the number of the horizontal driving lines in the pixel array structure 206, thus the driving parasitic capacitance 54 between the horizontal metal wires 31 in the driving electrodes and the horizontal driving lines is reduced, the influence of the driving parasitic capacitance 54 on the mutual capacitance 53 between the driving electrodes and the sensing electrodes is weakened, and the touch sensitivity of the touch liquid crystal display device is increased.

The number of the horizontal metal wires 31 in the touch layer 204 being less than the number of the horizontal driving lines in the pixel array structure 206 may also be explained as follows: the number of the horizontal metal wires 31 in the sensing electrodes is less than the number of the horizontal driving lines in the pixel array structure 206, thus the sensing parasitic capacitance 60 between the horizontal metal wires 31 in the sensing electrodes and the horizontal driving lines is reduced, the influence of the sensing parasitic capacitance 60 on the mutual capacitance 53 between the driving electrodes and the sensing electrodes is weakened, and the touch sensitivity of the touch liquid crystal display device is increased.

The number of the horizontal metal wires 31 in the touch layer 204 being less than the number of the horizontal driving lines in the pixel array structure 206 may further be explained as follows: both the number of the horizontal metal wires 31 in the driving electrodes and the number of the horizontal metal wires 31 in the sensing electrodes are less than the number of the horizontal driving lines in the pixel array structure 206, thus both the driving parasitic capacitance 54 between the horizontal metal wires 31 in the driving electrodes and the horizontal driving lines and the sensing parasitic capacitance 60 between the horizontal metal wires 31 in the sensing electrodes and the horizontal driving lines are reduced, the influence of both the driving parasitic capacitance 54 and the sensing parasitic capacitance 60 on the mutual capacitance 53 is weakened, and the touch sensitivity of the touch liquid crystal display device is further increased.

Preferably, in the embodiment, the number of the horizontal metal wires 31 included in the driving electrodes in addition or alternatively the sensing electrodes ranges from 2 to 10, to ensure a valid touch area of the touch layer 204 in the touch liquid crystal display device while reducing the influence of the parasitic capacitance between the horizontal metal wires 31 in the touch layer 204 and the horizontal driving lines on the mutual capacitance 53, enhancing the valid signal in the detecting circuit 56, and increasing the touch sensitivity of the touch liquid crystal display device.

Preferably, in the embodiment of the present invention, the horizontal metal wires 31 in the driving electrodes in addition or alternatively the sensing electrodes are evenly arranged, thus the consistency of sensitivity of each touch point in the touch layer 204 is ensured.

Similarly, a parasitic capacitance is generated between the source/drain electrode metal layer 42 and the touch electrode in the touch layer 204, this is because the source/drain electrode metal layer 42 includes multiple vertical driving lines corresponding to the vertical metal wires 32 in the driving electrodes and the sensing electrodes respectively and are located right above the vertical metal wires 32, therefore, a parasitic capacitance is generated between each of the vertical metal wires 32 and the corresponding vertical driving line. The parasitic capacitance generated between the vertical metal wire 32 in the driving electrodes and the corresponding vertical driving line is the driving parasitic capacitance 54, and the parasitic capacitance generated between the vertical metal wire 32 in the sensing electrodes and the corresponding vertical driving line is the sensing parasitic capacitance 60. Therefore, a current path 59 is formed between the driving electrodes and the sensing electrodes, thus the base signal in the detecting circuit 56 is increased, and the touch sensitivity of the touch liquid crystal display device is reduced.

However, in the embodiment, the number of the vertical metal wires 32 in the touch layer 204 is less than the number of the vertical driving lines in the pixel array structure 206, and there has no one-to-one correspondence between the vertical metal wires 32 and the vertical driving lines. Therefore, the right opposite area between the vertical metal wires 32 in the touch layer 204 and the vertical driving lines is reduced as a whole, the parasitic capacitance generated between the vertical metal wires 32 in the touch layer 204 and the vertical driving lines is reduced, the influence of the parasitic capacitance generated between the vertical metal wires 32 in the touch layer 204 and the vertical driving lines on the mutual capacitance 53 between the driving electrodes and the sensing electrodes is weakened, the valid signal in the detecting circuit 56 is enhanced, and the touch sensitivity of the touch liquid crystal display device is increased.

It should be noted that in the present embodiment the number of the vertical metal wires 32 in the touch layer 204 being less than the number of the vertical driving lines in the pixel array structure 206 may be explained as follows:

the number of the vertical metal wires 32 in the driving electrodes is less than the number of the vertical driving lines in the pixel array structure 206, therefore, the driving parasitic capacitance 54 between the vertical metal wires 32 in the driving electrodes and the vertical driving lines is reduced, the influence of the driving parasitic capacitance 54 on the mutual capacitance 53 between the driving electrodes and the sensing electrodes is weakened, and the touch sensitivity of the touch liquid crystal display device is increased.

The number of the vertical metal wires 32 in the touch layer 204 being less than the number of the vertical driving lines in the pixel array structure 206 may also be explained as follows: the number of the vertical metal wires 32 in the sensing electrodes is less than the number of the vertical driving lines in the pixel array structure 206, therefore, the sensing parasitic capacitance 60 between the vertical metal wires 32 in the sensing electrodes and the vertical driving lines is reduced, the influence of the sensing parasitic capacitance 60 on the mutual capacitance 53 between the driving electrodes and the sensing electrodes is weakened, and the touch sensitivity of the touch liquid crystal display device is increased.

The number of the vertical metal wires 32 in the touch layer 204 being less than the number of the vertical driving lines in the pixel array structure 206 may further be explained as follows: both the number of the vertical metal wires 32 in the driving electrodes and the number of the vertical metal wires 32 in the sensing electrodes are less than the number of the vertical driving lines in the pixel array structure 206, therefore, both the driving parasitic capacitance 54 between the vertical metal wires 32 in the driving electrodes and the vertical driving lines and the sensing parasitic capacitance 60 between the vertical metal wires 32 in the sensing electrodes and the vertical driving lines are reduced, the influence of both the driving parasitic capacitance 54 and the sensing parasitic capacitance 60 on the mutual capacitance 53 is weakened, and the touch sensitivity of the touch liquid crystal display device is increased.

Preferably, in the embodiment, the number of the vertical metal wires 32 included in the driving electrodes in addition or alternatively the sensing electrodes ranges from 2 to 10, to ensure a valid touch area of the touch layer 204 in the touch liquid crystal display device while reducing the influence of the parasitic capacitance between the vertical metal wires 32 in the touch layer 204 and the vertical driving lines on the mutual capacitance 53, enhancing the valid signal in the detecting circuit 56 and increasing the touch sensitivity of the touch liquid crystal display device.

Preferably, in the embodiment of the present invention, the vertical metal wires 32 in the driving electrodes in addition or alternatively the sensing electrodes are evenly arranged, thus the consistency of sensitivity of each touch point in the touch layer 204 is ensured.

It should be noted that in the present embodiment, in order to ensure the aperture opening ratio of the touch liquid crystal display device, the vertical metal wires 32 and the vertical driving lines in the pixel array structure 206 may overlap with each other, in addition or alternatively the horizontal metal wires 31 and the horizontal driving lines in the pixel array structure 206 may be arranged to be overlapped with each other. However, in order to increase the touch sensitivity of the touch liquid crystal display device, the vertical metal wires 32 and the vertical driving lines in the pixel array structure 206 may be arranged in a stagger manner, in addition or alternatively the horizontal metal wires 31 and the horizontal driving lines in the pixel array structure 206 may be arranged in a stagger manner, therefore, the aperture opening ratio of the touch liquid crystal display device is reduced.

In summary, in the touch liquid crystal display device according to the present embodiment of the present invention, the number of the horizontal metal wires 31 in the touch layer 204 in addition or alternatively the number of the vertical metal wires 32 in the touch layer 204 are reduced, the vertical metal wires 32 and the vertical driving lines in the pixel array structure 206 are arranged in an interleaved way, in addition or alternatively the horizontal metal wires 31 and the horizontal driving lines in the pixel array structure 206 are arranged in a stagger manner, and the common electrode layer 43 includes multiple common electrodes, where arrangement pattern of the multiple common electrodes is the same as that of the electrodes in the touch layer 204, therefore, the parasitic capacitance between the gate electrode metal layer 41 and the touch layer 204 is reduced, the parasitic capacitance between the source/drain electrode metal layer 42 and the touch layer 204 is reduced, and thus the touch sensitivity of the touch liquid crystal display device is increased.

Another Embodiment

Figure 8:
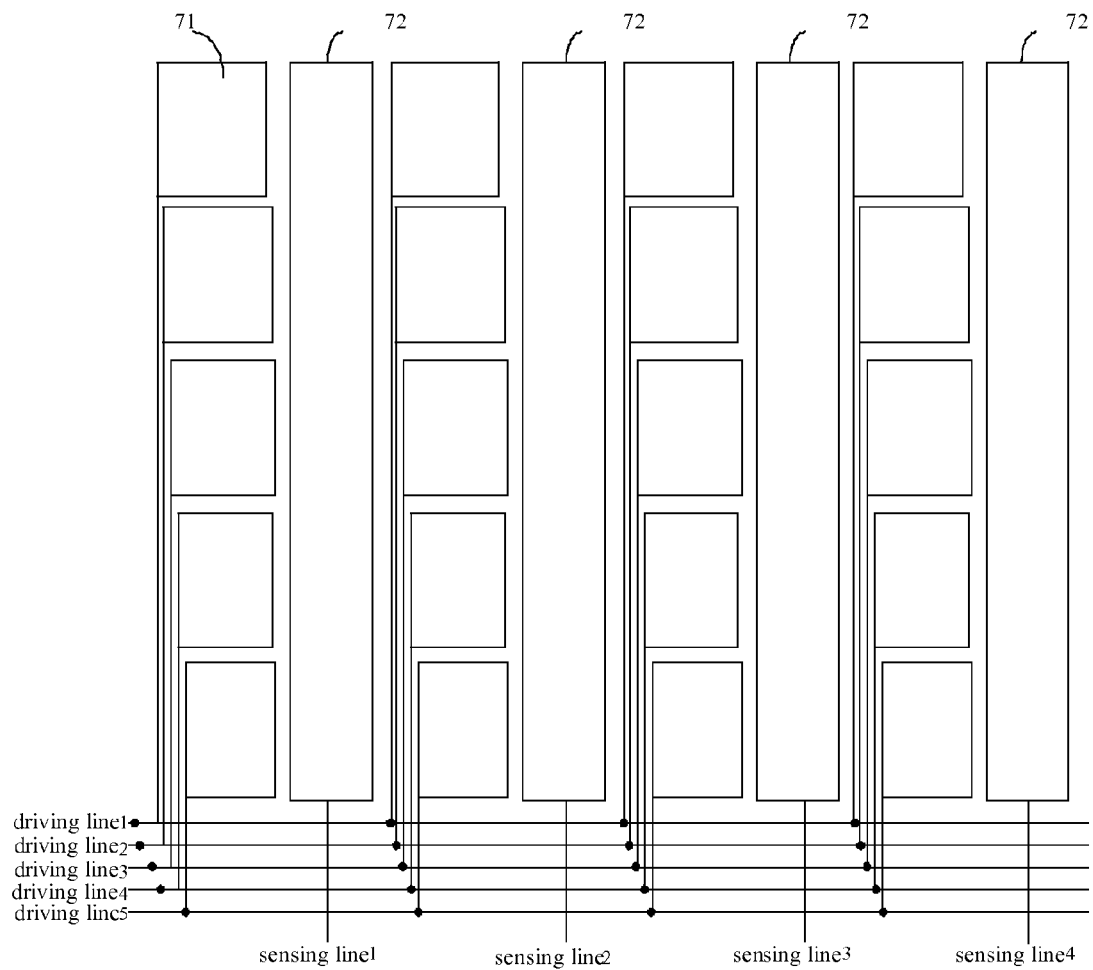
FIG. 8 is a simplified structural diagram of a touch layer in a touch liquid crystal display device according to another embodiment of the present invention.

As illustrated in FIG. 8, this embodiment differs from the embodiments of FIGS. 2-4 in that, the touch layer 204 in the touch liquid crystal display device is a single layer structure, where both multiple block driving electrodes 71 and multiple strip sensing electrodes 72 are formed in the same layer and are electrically connected via external leads. Both of the block driving electrodes 71 and the strip sensing electrodes 72 include metal grids formed by multiple horizontal metal wires 31 and multiple vertical metal wires 32 interleaved with each other.

Figure 7:
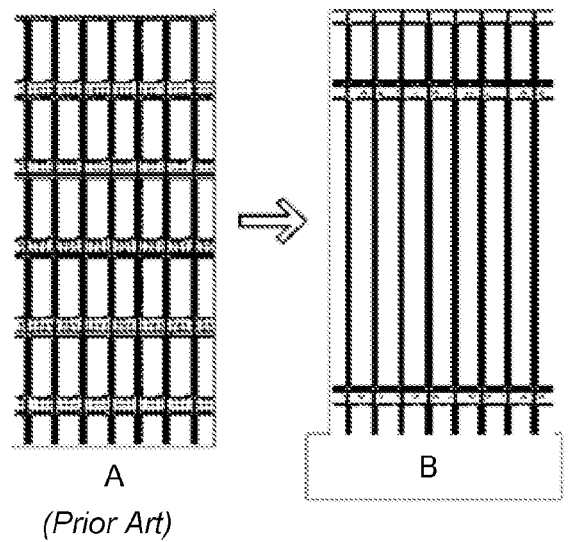
FIG. 7 are simplified diagrams for comparing the structure of the driving electrodes or the sensing electrodes in the prior art and the structure of the driving electrodes or the sensing electrodes according to another embodiment of the present invention, where
Figure 10:
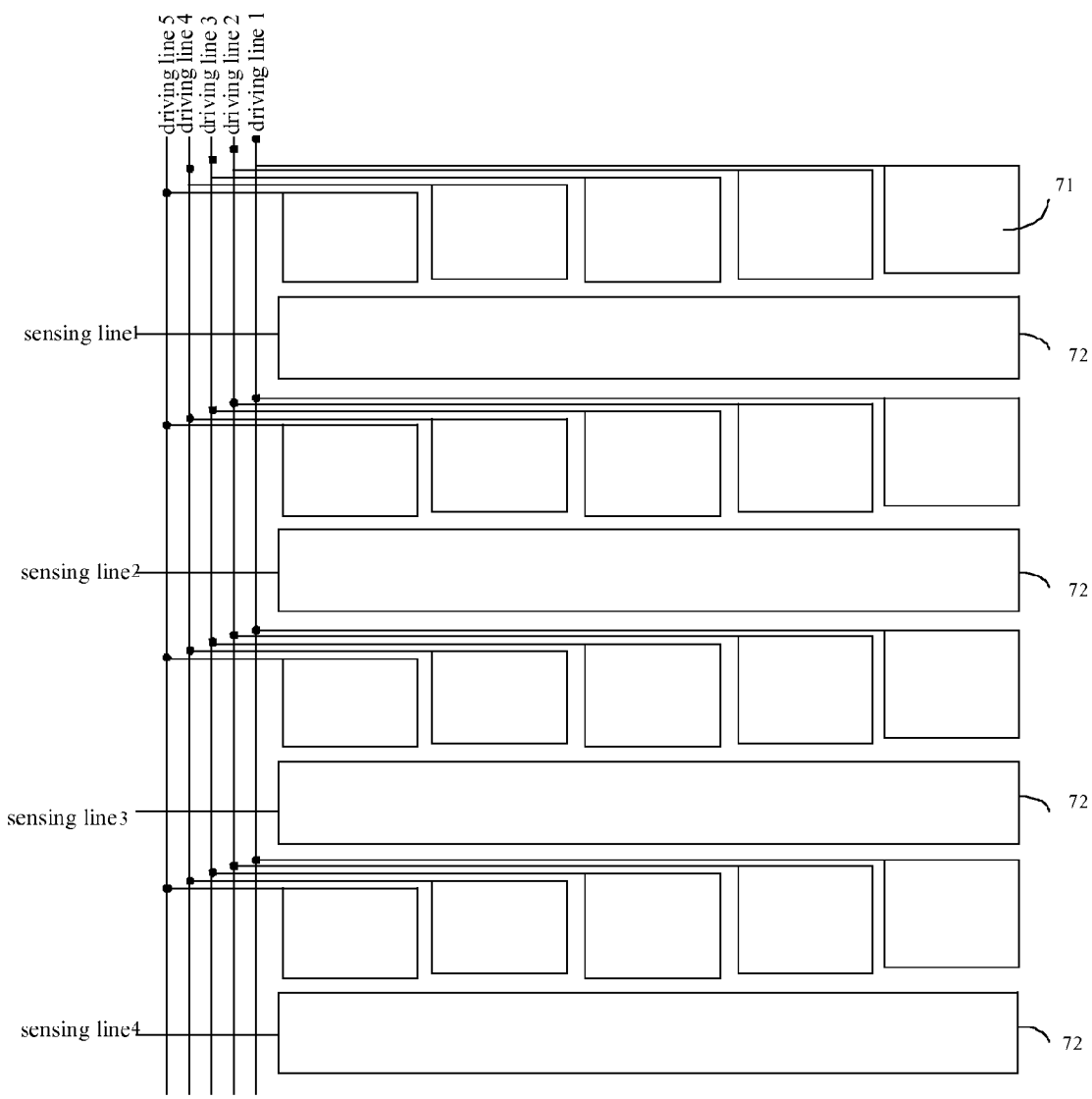
FIG. 10 is a simplified structural diagram of a touch layer in a touch liquid crystal display device according to another embodiment of the present invention.

It should be noted that in an embodiment of the present invention, the driving electrodes 71 and the sensing electrodes 72 adjacent to each other in the touch layer 204 may be disposed in an interleaved way in the column direction, as illustrated in FIG. 7. In another embodiment of the present invention, the driving electrodes 71 and the sensing electrodes 72 adjacent to each other in the touch layer 204 may be disposed in an interleaved way in the row direction, as illustrated in FIG. 10.

In the case where the driving electrodes 71 and the sensing electrodes 72 adjacent to each other in the touch layer 204 are disposed in an interleaved way in the column direction, parasitic capacitances are generated between the touch layer 204 and the gate electrode metal layer 41, between the touch layer 204 and the source/drain electrode metal layer 42 and between the touch layer 204 and the common electrode layer 43, since the distances between the touch layer 204 and the gate electrode metal layer 41, between the touch layer 204 and the source/drain electrode metal layer 42 and between the touch layer 204 and the common electrode layer 43 are small. The parasitic capacitance between the touch layer 204 and the gate electrode metal layer 41 is generated between the horizontal metal wires 31 in the touch layer 204 and the horizontal driving line in the gate electrode metal layer 41. The parasitic capacitance between the touch layer 204 and the source/drain electrode metal layer 42 is generated between the vertical metal wires 32 in the touch layer 204 and the vertical driving lines in the source/drain electrode metal layer 42.

In the present embodiment, the driving electrodes 71 and the sensing electrodes 72 in the touch layer 204 are arranged in an interleaving way in the column direction, and the mutual capacitance 53 is generated between the driving electrodes 71 and the sensing electrodes 72, that is, the mutual capacitance 53 is generated between the horizontal electrodes. Moreover, the parasitic capacitance generated between the vertical metal wires 32 in the touch layer 204 and the vertical driving lines in the source/drain electrode metal layer 42 is generated between the vertical electrodes. Therefore, in the present embodiment, the parasitic capacitance between the touch layer 204 and the source/drain metal layer 42 has no significant influence on the mutual capacitance 53, that is, the touch sensitivity of the touch liquid crystal display device will not be greatly reduced.

Therefore, in order to increase the touch sensitivity of the touch liquid crystal display device, the number of the horizontal metal wires 31 in the touch layer 204 may be less than the number of the horizontal driving lines in the pixel array structure 206, to make the horizontal metal wires 31 in the touch layer 204 and the horizontal driving lines in the gate electrode metal layer 41 no longer have the one-to-one correspondence, therefore, the right opposite area between the horizontal metal wires 31 in the touch layer 204 and the horizontal driving lines is reduced as a whole, the parasitic capacitance generated between the horizontal metal wires 31 in the touch layer 204 and the horizontal driving lines is reduced, the influence of the parasitic capacitance generated between the horizontal metal wires 31 in the touch layer 204 and the horizontal driving lines on the mutual capacitance 53 between the driving electrodes 71 and the sensing electrodes 72 is weakened, the valid signal in the detecting circuit 56 is enhanced, and the touch sensitivity of the touch liquid crystal display device is increased.

It should be noted that in the present embodiment, the number of the horizontal metal wires 31 in the touch layer 204 being less than the number of the horizontal driving lines in the pixel array structure 206 may be explained as follows:

The number of the horizontal metal wires 31 in the driving electrodes 71 is less than the number of the horizontal driving lines in the pixel array structure 206, therefore, the driving parasitic capacitance 54 between the horizontal metal wires 31 in the driving electrodes 71 and the horizontal driving lines is reduced, the influence of the driving parasitic capacitance 54 on the mutual capacitance 53 between the driving electrodes 71 and the sensing electrodes 72 is weakened, and the touch sensitivity of the touch liquid crystal display device is increased.

The number of the horizontal metal wires 31 in the touch layer 204 being less than the number of the horizontal driving lines in the pixel array structure 206 may also be explained as follows: the number of the horizontal metal wires 31 in the sensing electrodes 72 is less than the number of the horizontal driving lines in the pixel array structure 206, therefore, the sensing parasitic capacitance 60 between the horizontal metal wires 31 in the sensing electrodes 72 and the horizontal driving lines is reduced, the influence of the sensing parasitic capacitance 60 on the mutual capacitance 53 between the driving electrodes 71 and the sensing electrodes 72 is weakened, and the touch sensitivity of the touch liquid crystal display device is increased.

The number of the horizontal metal wires 31 in the touch layer 204 being less than the number of the horizontal driving lines in the pixel array structure 206 may further be explained as follows: both the number of the horizontal metal wires 31 in the driving electrodes 71 and the number of the horizontal metal wires 31 in the sensing electrodes 72 are less than the number of the horizontal driving lines in the pixel array structure 206, therefore, both the driving parasitic capacitance 54 between the horizontal metal wires 31 in the driving electrodes 71 and the horizontal driving lines and the sensing parasitic capacitance 60 between the horizontal metal wires 31 in the sensing electrodes 72 and the horizontal driving lines are reduced, the influence of both the driving parasitic capacitance 54 and the sensing parasitic capacitance 60 on the mutual capacitance 53 is weakened, and the touch sensitivity of the touch liquid crystal display device is increased.

Preferably, in the embodiment, the number of the horizontal metal wires 31 included in the driving electrodes 71 in addition or alternatively the sensing electrodes 72 ranges from 2 to 10, to ensure a valid touch area of the touch layer 204 in the touch liquid crystal display device while reducing the influence of the parasitic capacitance between the horizontal metal wires 31 in the touch layer 204 and the horizontal driving lines on the mutual capacitance 53, enhancing the valid signal in the detecting circuit 56, and increasing the touch sensitivity of the touch liquid crystal display device.

Preferably, in the embodiment of the present invention, the horizontal metal wires 31 in the driving electrodes 71 in addition or alternatively the sensing electrodes 72 are evenly arranged, thus the consistency of sensitivity of each touch point in the touch layer 204 is ensured.

It should be noted that in the embodiment, in order to ensure the aperture opening ratio of the touch liquid crystal display device, the horizontal metal wires 31 and the horizontal driving lines in the pixel array structure 206 may overlap with each other. However, in order to increase the touch sensitivity of the touch liquid crystal display device, the horizontal metal wires 31 and the horizontal driving lines in the pixel array structure 206 may be arranged in a staggered manner, therefore, the aperture opening ratio of the touch liquid crystal display device is reduced.

In summary, in the touch liquid crystal display device according to the present embodiment of the present invention, the number of the horizontal metal wires 31 in the touch layer 204 is reduced, and the horizontal metal wires 31 and the horizontal driving lines in the pixel array structure 206 are disposed in a staggered manner, therefore, the parasitic capacitance between the gate electrode metal layer 41 and the touch layer 204 is reduced, and the touch sensitivity of the touch liquid crystal display device is increased.

Another Embodiment

Figure 9:
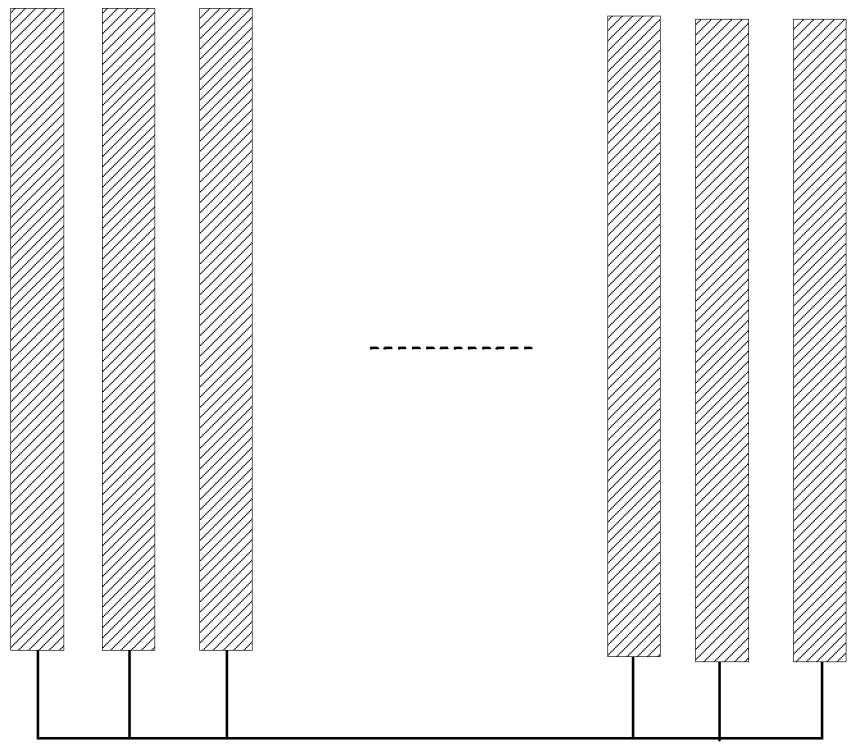
FIG. 9 is a simplified structural diagram of a common electrode layer in the touch liquid crystal display device according to another embodiment of the present invention.

In order to further increase the touch sensitivity of the touch liquid crystal display device, the common electrode layer 43 in the pixel array structure 206 includes multiple vertically-arranged common electrode lines in the touch liquid crystal display device according to the present embodiment as illustrated in FIG. 9.

As illustrated in FIG. 8, in the touch liquid crystal display device according to the embodiment, multiple block driving electrodes 71 and multiple strip sensing electrodes 72 are formed on the touch layer 204, are disposed in an interleaved way in the column direction and are electrically connected via external leads. Both of the block driving electrodes 71 and the strip sensing electrodes 72 include metal grids formed by multiple horizontal metal wires 31 and multiple vertical metal wires 32 crossing each other.

The driving electrodes 71 and the sensing electrodes 72 in the touch layer 204 are disposed in an interleaved way in the column direction, and the mutual capacitance 53 is generated between the driving electrodes 71 and the sensing electrodes 72, that is, the mutual capacitance 53 is generated between the adjacent horizontal electrodes. However, in the present embodiment, the common electrode layer 43 in the pixel array structure 206 includes multiple vertically-arranged common electrode lines (Vcom lines). Specifically, the common electrodes of each column of pixels are connected together to form a common electrode line, that is, there is no horizontal common electrode between the adjacent driving electrodes 71 and sensing electrodes 71 for coupling the driving electrodes 71 to the sensing electrodes 72 to form a parasitic capacitance, therefore, the influence of the parasitic capacitance generated between the touch layer 204 and the common electrode layer 43 on the mutual capacitance 53 generated between the driving electrodes 71 and the sensing electrodes 72 is greatly weakened, and the touch sensitivity of the touch liquid crystal display device is increased.

Another Embodiment

The touch liquid crystal display device of this embodiment differs from that of the embodiment of FIG. 8 in that, the adjacent driving electrodes 71 and sensing electrodes 72 in the touch layer 204 are arranged in an interleaved way in the row direction, as illustrated in FIG. 10.

In the case where the driving electrodes 71 and the sensing electrodes 72 adjacent to each other in the touch layer 204 are arranged in an interleaved way in the row direction, the mutual capacitance 53 between the driving electrodes 71 and the sensing electrodes 72 is generated between adjacent vertically-arranged electrodes. Moreover, the parasitic capacitance generated between the horizontal metal wires 31 in the touch layer 204 and the horizontal driving lines in the gate electrode metal layer 41 is generated between horizontal electrodes. Therefore, in the present embodiment, the parasitic capacitance between the touch layer 204 and the gate electrode metal layer 41 will not greatly affect the mutual capacitance 53, and the touch sensitivity of the touch liquid crystal display device will not be reduced.

Therefore, in order to increase the touch sensitivity of the touch liquid crystal display device according to the embodiment, the number of the vertical metal wires 32 in the touch layer 204 may be less than the number of the vertical driving lines in the pixel array structure 206, and the vertical metal wires 32 in the touch layer 204 and the vertical driving lines in the source/drain electrode metal layer 42 no longer have the one-to-one correspondence, therefore, the parasitic capacitance between the vertical metal wires 32 in the touch layer 204 and the vertical driving lines is reduced, the influence of the parasitic capacitance between the vertical metal wires 32 in the touch layer 204 and the vertical driving lines on the mutual capacitance 53 between the driving electrodes 71 and the sensing electrodes 72 is weakened, the valid signal in the detecting circuit 56 is enhanced, and the touch sensitivity of the touch liquid crystal display device is increased.

Similarly, in the embodiment, the number of the vertical metal wires 32 in the touch layer 204 being less than the number of the vertical driving lines in the pixel array structure 206 may be explained as follows:

The number of the vertical metal wires 32 in the driving electrodes 71 is less than the number of the vertical driving lines in the pixel array structure 206, therefore, the driving parasitic capacitance 54 between the vertical metal wires 32 in the driving electrodes 71 and the vertical driving lines is reduced, the influence of the driving parasitic capacitance 54 on the mutual capacitance 53 between the driving electrodes 71 and the sensing electrodes 72 is weakened, and the touch sensitivity of the touch liquid crystal display device is increased.

The number of the vertical metal wires 32 in the touch layer 204 being less than the number of the vertical driving lines in the pixel array structure 206 may also be explained as follows: the number of the vertical metal wires 32 in the sensing electrodes 72 is less than the number of the vertical driving lines in the pixel array structure 206, therefore, the sensing parasitic capacitance 60 between the vertical metal wires 32 in the sensing electrodes 72 and the vertical driving lines is reduced, the influence of the sensing parasitic capacitance 60 on the mutual capacitance 53 between the driving electrodes 71 and the sensing electrodes 72 is weakened, and the touch sensitivity of the touch liquid crystal display device is increased.

The number of the vertical metal wires 32 in the touch layer 204 being less than the number of the vertical driving lines in the pixel array structure 206 may further be explained as follows: both the number of the vertical metal wires 32 in the driving electrodes 71 and the number of the vertical metal wires 32 in the sensing electrodes 72 are less than the number of the vertical driving lines in the pixel array structure 206, therefore, both the driving parasitic capacitance 54 between the vertical metal wires 32 in the driving electrodes 71 and the vertical driving lines and the sensing parasitic capacitance 60 between the vertical metal wires 32 in the sensing electrodes 72 and the vertical driving lines are reduced, the influence of both the driving parasitic capacitance 54 and the sensing parasitic capacitance 60 on the mutual capacitance 53 is weakened, and the touch sensitivity of the touch liquid crystal display device is increased.

Preferably, in the embodiment, the number of the vertical metal wires 32 included in the driving electrodes 71 in addition or alternatively the sensing electrodes 72 ranges from 2 to 10, to ensure a valid touch area of the touch layer 204 in the touch liquid crystal display device while reducing the influence of the parasitic capacitance between the vertical metal wires 32 in the touch layer 204 and the vertical driving lines on the mutual capacitance 53, enhancing the valid signal in the detecting circuit 56, and increasing the touch sensitivity of the touch liquid crystal display device.

Preferably, in the embodiment of the present invention, the vertical metal wires 32 in the driving electrodes 71 in addition or alternatively the sensing electrodes 72 are evenly arranged, therefore the consistency of sensitivity of each touch point in the touch layer 204 is ensured.

It should be noted that in the embodiment, in order to ensure the aperture opening ratio of the touch liquid crystal display device, the vertical metal wires 32 and the vertical driving lines in the pixel array structure 206 may overlap with each other. However, in order to increase the touch sensitivity of the touch liquid crystal display device, the vertical metal wires 32 and the vertical driving lines in the pixel array structure 206 may be disposed in a stagger manner, therefore, the aperture opening ratio of the touch liquid crystal display device is reduced.

In summary, in the touch liquid crystal display device according to the present embodiment of the present invention, the number of the vertical metal wires 32 in the touch layer 204 is reduced, and the vertical metal wires 32 and the vertical driving lines in the pixel array structure 206 are disposed in a stagger manner, so as to reduce the parasitic capacitance between the source/drain electrode metal layer 42 and the touch layer 204, and thus increase the touch sensitivity of the touch liquid crystal display device.

Another Embodiment

Figure 11:
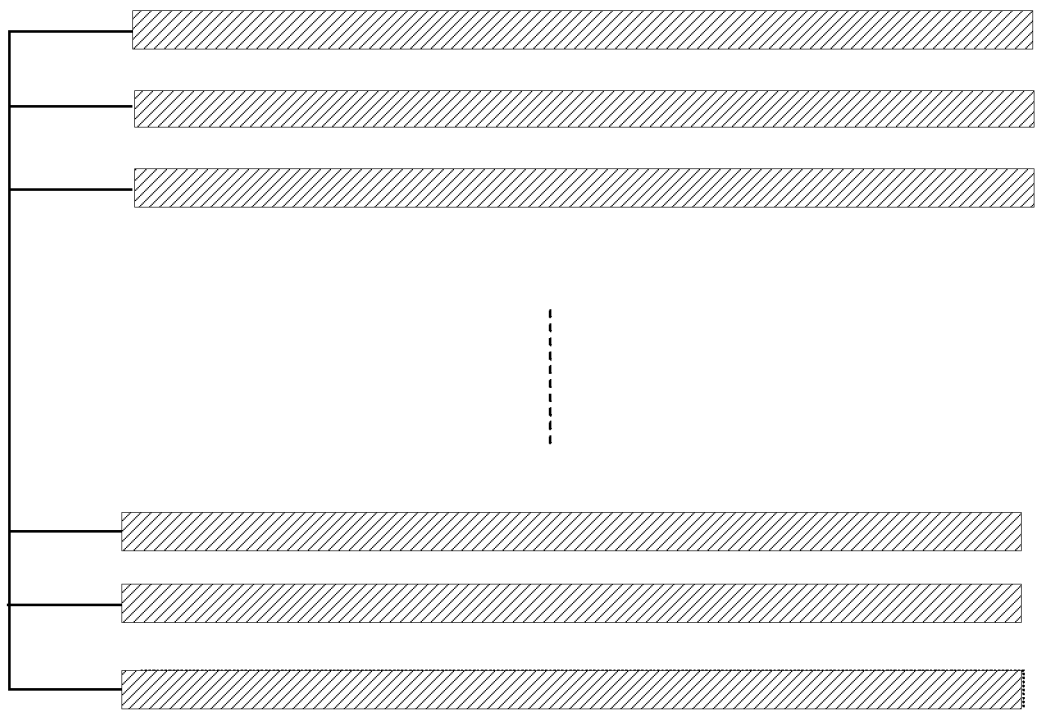
FIG. 11 is a simplified structural diagram of a common electrode layer in the touch liquid crystal display device according to another embodiment of the present invention.

In order to further increase the touch sensitivity of the touch liquid crystal display device of the embodiment of FIG. 10, the common electrode layer 43 in the pixel array structure 206 includes multiple horizontally-arranged common electrode lines (Vcom lines) in the touch liquid crystal display device according to the present embodiment as illustrated in FIG. 11.

Referring to FIG. 10, in the case where the driving electrodes 71 and the sensing electrodes 72 in the touch layer 204 are disposed in an interleaved way in the row direction, the mutual capacitance 53 between the driving electrodes 71 and the sensing electrodes 72 is generated between adjacent vertically-arranged electrodes. The common electrode layer 43 in the pixel array structure includes multiple horizontally-arranged common electrode lines. Specifically, the common electrodes of each row of pixels are connected together to form a common electrode line, that is, there is no vertical common electrode between the adjacent driving electrodes 71 and sensing electrodes 72 for coupling the driving electrodes 71 to the sensing electrodes 72 to form a parasitic capacitance, therefore, the influence of the parasitic capacitance generated between the touch layer 204 and the common electrode layer 43 on the mutual capacitance 53 generated between the driving electrodes 71 and the sensing electrodes 72 is greatly weakened, and the touch sensitivity of the touch liquid crystal display device is increased.

In summary, the touch liquid crystal display device according to embodiments of the present invention has a simple manufacturing process, a small thickness, a small size and a high touch control sensitivity.

Although the present invention is disclosed by way of preferred embodiments as described above, those embodiments are not intended to limit the present invention. Possible amendments and modifications may be made to the technical solution of the present invention by those skilled in the art by using the methods and the technical contents disclosed above without departing from the spirit and the scope of the present invention. Therefore, any change, equivalent alternation and modification made to the above embodiments according to the technical principle of the present invention without departing from the technical solution of the present invention fall within the scope of protection of the present invention.

What is claimed is:

1. A touch liquid crystal display device, comprising first and second substrates opposite to each other, and a liquid crystal layer disposed between the first and second substrates, wherein, the first substrate comprises:
   a touch layer disposed on a surface of the first substrate facing the liquid crystal layer;
   an insulating layer disposed on a surface of the touch layer and covering the touch layer; and
   a pixel array structure disposed on a surface of the insulating layer facing away from the touch layer,
   wherein the touch layer comprises a plurality of driving electrodes and a plurality of sensing electrodes, wherein the driving electrodes and the sensing electrodes are interleaved with each other and insulated from each other,
   wherein each of the plurality of driving electrodes and each of the plurality of sensing electrodes comprise a plurality of horizontal metal wires and a plurality of vertical metal wires, wherein the plurality of horizontal metal wires and the plurality of vertical metal wires are interleaved with each other, and wherein each of the driving electrodes comprises a plurality of driving sub-electrodes insulated from each other, or wherein each of the sensing electrodes comprises a plurality of sensing sub-electrodes insulated from each other.

2. The touch liquid crystal display device according to claim 1, wherein adjacent driving sub-electrodes are electrically connected via a bridge structure; or adjacent sensing sub-electrodes are electrically connected via a bridge structure.

3. The touch liquid crystal display device according to claim 2, wherein the bridge structure is an interconnect metal in a same layer with a gate electrode metal layer in the pixel array structure, or the bridge structure is an interconnect metal in a same layer as a source/drain electrode metal layer in the pixel array structure.

4. The touch liquid crystal display device according to claim 1, wherein a common electrode layer in the pixel array structure comprises a plurality of common electrodes that is arranged in a pattern as a pattern of the driving and sensing electrodes in the touch layer.

5. The touch liquid crystal display device according to claim 1, wherein a number of the vertical metal wires in the touch layer is less than a number of vertical driving lines in the pixel array structure, in addition or alternatively, a number of the horizontal metal wires in the touch layer is less than a number of horizontal driving lines in the pixel array structure.

6. The touch liquid crystal display device according to claim 5, wherein the number of the horizontal metal wires included in at least one of the driving electrodes or the sensing electrodes ranges from 2 to 10; and the number of the vertical metal wires included in at least one of the driving electrodes or the sensing electrodes ranges from 2 to 10.

7. The touch liquid crystal display device according to claim 5, wherein the horizontal metal wires in at least one of the driving electrodes or the sensing electrodes are evenly arranged in the touch layer; and the vertical metal wires in at least one of the driving electrodes or the sensing electrodes are evenly arranged.

8. The touch liquid crystal display device according to claim 5, wherein the vertical metal wires and the vertical driving lines in the pixel array structure are arranged in a staggered manner; in addition or alternatively, the horizontal metal wires and the horizontal driving lines in the pixel array structure are arranged in a staggered manner.

9. A touch liquid crystal display device, comprising first and second substrates opposite to each other, and a liquid crystal layer disposed between the first and second substrates, wherein, the first substrate comprises:

a touch layer disposed on a surface of the first substrate facing the liquid crystal layer;

an insulating layer disposed on a surface of the touch layer and covering the touch layer; and a pixel array structure disposed on a surface of the insulating layer facing away from the touch layer, wherein the touch layer comprises a plurality of block driving electrodes and a plurality of strip sensing electrodes, the plurality of block driving electrodes and the plurality of strip sensing electrodes are located in a same layer, and each of the block driving electrodes and each of the strip sensing electrodes comprises a plurality of metal grids formed by a plurality of horizontal metal wires and a plurality of vertical metal wires interleaved with each other.

10. The touch liquid crystal display device according to claim 9, wherein the plurality of block driving electrodes and the plurality of strip sensing electrodes each are electrically connected via an external wire.

11. The touch liquid crystal display device according to claim 10, wherein the driving electrodes and the sensing electrodes are adjacent to each other and are interleaved with each other in a column direction.

12. The touch liquid crystal display device according to claim 11, wherein a common electrode layer in the pixel array structure comprises a plurality of vertically-arranged common electrode lines.

13. The touch liquid crystal display device according to claim 11, wherein the number of the horizontal metal wires in the touch layer is less than the number of horizontal driving lines in the pixel array structure, and the number of the horizontal metal wires included in at least one of the driving electrodes or the sensing electrodes ranges from 2 to 10.

14. The touch liquid crystal display device according to claim 13, wherein the horizontal metal wires in at least one of the driving electrodes or the sensing electrodes are evenly arranged.

15. The touch liquid crystal display device according to claim 13, wherein the horizontal metal wires and the horizontal driving lines in the pixel array structure are arranged in a staggered manner.

16. The touch liquid crystal display device according to claim 10, wherein the driving electrodes and the sensing electrodes adjacent to each other are staggered in a row direction.

17. The touch liquid crystal display device according to claim 16, wherein a common electrode layer in the pixel array structure comprises a plurality of horizontally-arranged common electrode lines.

18. The touch liquid crystal display device according to claim 16, wherein the number of the vertical metal wires in the touch layer is less than the number of vertical driving lines in the pixel array structure, and the number of the vertical metal wires included in at least one of the driving electrodes or the sensing electrodes ranges from 2 to 10, and the vertical metal wires in at least one of the driving electrodes or the sensing electrodes are evenly arranged.

19. The touch liquid crystal display device according to claim 18, wherein the vertical metal wires and the vertical driving lines in the pixel array structure are arranged in a staggered manner.

* * * * *